United States Patent
Aiki et al.

(10) Patent No.: US 11,502,294 B2
(45) Date of Patent: Nov. 15, 2022

(54) SOLUTION AND METHOD FOR PRODUCING THE SAME, AND A METHOD FOR PRODUCING ACTIVE MATERIAL, FOR SECONDARY BATTERY

(71) Applicant: DOWA ELECTRONICS MATERIALS CO., LTD., Tokyo (JP)

(72) Inventors: Yoshiaki Aiki, Tokyo (JP); Toshihiko Ueyama, Tokyo (JP); Koji Tanoue, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 0 days.

(21) Appl. No.: 17/712,786

(22) Filed: Apr. 4, 2022

(65) Prior Publication Data
US 2022/0231287 A1  Jul. 21, 2022

Related U.S. Application Data

(62) Division of application No. 16/082,794, filed as application No. PCT/JP2017/009615 on Mar. 9, 2017, now abandoned.

(30) Foreign Application Priority Data

Mar. 9, 2016 (JP) .................................. 2016-045273
Jun. 28, 2016 (JP) .................................. 2016-127279
Mar. 9, 2017 (JP) .................................. 2017-045206

(51) Int. Cl.
*C01G 33/00* (2006.01)
*C01G 51/00* (2006.01)
(Continued)

(52) U.S. Cl.
CPC .......... *H01M 4/366* (2013.01); *C01G 23/005* (2013.01); *C01G 33/00* (2013.01); *C01G 51/42* (2013.01);
(Continued)

(58) Field of Classification Search
None
See application file for complete search history.

(56) References Cited

U.S. PATENT DOCUMENTS 9,761,868 B2    9/2017  Nagatomi
2015/0280210 A1  10/2015  Yamamoto
2016/0043391 A1*  2/2016  Nagatomi ......... H01M 10/0525
                                                  427/126.3

FOREIGN PATENT DOCUMENTS

CN    101478035 A  *  7/2009
JP    2010-129190 A    6/2010
(Continued)

OTHER PUBLICATIONS

JP-2014210701-A translation (Year: 2014).*
(Continued)

*Primary Examiner* — Ula C Ruddock
*Assistant Examiner* — Amanda Rosenbaum
(74) *Attorney, Agent, or Firm* — Greenblum & Bernstein, P.L.C.

(57) ABSTRACT

A producing method of a solution that contains lithium, at least one of a niobium complex and a titanium complex, and ammonia, wherein an amount of the ammonia in the solution is 0.3 mass % or less. The solution is suitable for forming a coating layer capable of improving battery characteristics of an active material in a battery.

11 Claims, 3 Drawing Sheets

(51) Int. Cl.
  H01M 4/131 (2010.01)
  H01M 4/1391 (2010.01)
  H01M 4/485 (2010.01)
  H01M 4/36 (2006.01)
  C01G 23/00 (2006.01)
  H01M 4/505 (2010.01)
  H01M 4/525 (2010.01)
  H01M 4/62 (2006.01)
  H01M 10/0525 (2010.01)
  H01M 4/02 (2006.01)

(52) U.S. Cl.
  CPC ......... *H01M 4/131* (2013.01); *H01M 4/1391* (2013.01); *H01M 4/485* (2013.01); *H01M 4/505* (2013.01); *H01M 4/525* (2013.01); *H01M 4/62* (2013.01); *H01M 10/0525* (2013.01); *C01P 2004/03* (2013.01); *C01P 2006/12* (2013.01); *C01P 2006/40* (2013.01); *H01M 2004/028* (2013.01)

(56) References Cited

FOREIGN PATENT DOCUMENTS

| JP | 2012-074240 A | 4/2012 |
|---|---|---|
| JP | 2014-210701 A | 11/2014 |
| JP | 2014210701 A * | 11/2014 |
| JP | 2014-238957 A | 12/2014 |
| JP | 2015-103321 A | 6/2015 |
| JP | 2017-191667 A | 10/2017 |

OTHER PUBLICATIONS

CN 101478035A translation (Year: 2009).*

Narendar, Y., & Messing, G. L. (1997). Synthesis, Decomposition and Crystallization Characteristics of Peroxo-Cetrato-Niobium: An Aqueous Niobium Precursor. Chemistry of Materials, 9(2), 580-587 (Year: 1997).*

ISR issued is WIPO Patent Application No. PCT/JP2017/009615, Apr. 18, 2017, translation.

IPRP issued in WIPO Patent Application No. PCT/JP2017/009615, Sep. 11, 2018, translation.

Y. Narendar et al., Department of Materials Science and Engineering, Pennsylvania State University, "Synthesis, Decomposition and Crystallization Characteristics of Peroxo-Citrato-Niobium: An Aqueous Niobium Precursor", Chem. Mater. 1997.

Search Report issued in European Patent Application No. 17763410.2, dated Oct. 4, 2019, 7 pages.

* cited by examiner

SOLUTION AND METHOD FOR PRODUCING THE SAME, AND A METHOD FOR PRODUCING ACTIVE MATERIAL, FOR SECONDARY BATTERY

CROSS-REFERENCE TO RELATED APPLICATIONS

This application is a Divisional of U.S. patent application Ser. No. 16/082,794, filed Sep. 6, 2018, which is a National Stage Entry of International Patent Application No. PCT/JP2017/009615, filed Mar. 9, 2017, which claims the benefit of Japanese Patent Application No. 2017-045206, filed Mar. 9, 2017, Japanese Patent Application No. 2016-127279, filed Jun. 28, 2016, and Japanese Patent Application No. 2016-045273, filed Mar. 9, 2016 The disclosure of each of the applications listed above is incorporated by reference herein in its entirety.

TECHNICAL FIELD

The present invention relates to a solution exhibiting suitable storage stability and battery characteristics for forming a positive electrode active material of a secondary battery, a method for producing the same, and a method for producing the positive electrode active material for forming the secondary battery formed using the above solution.

DESCRIPTION OF THE RELATED ART

Lithium ion battery is characterized by high energy density and capable of being operated at high voltage. Therefore, it is used as an information device such as a mobile phone as a secondary battery which is easy to be reduced in size and weight. Further, in recent years, demands for secondary batteries for large-scale power such as for hybrid vehicles are also increasing.

In the lithium ion battery, a nonaqueous solvent electrolyte in which a salt is dissolved in an organic solvent is generally used as an electrolyte. However, since the nonaqueous solvent electrolyte is flammable, there is a necessity for solving a problem on safety in using the lithium ion battery. In order to ensure such safety, for example, measures such as incorporating a safety device into the lithium ion battery are being implemented. Further, as a more fundamental solution, there has been proposed a method for using the abovementioned electrolyte as a nonflammable electrolyte, that is, a method for forming a lithium ion conductive solid electrolyte.

Generally, an electrode reaction of a battery occurs at the interface between the electrode active material and the electrolyte. Here, when a liquid electrolyte is used for the electrolyte, by immersing the electrode containing the electrode active material in the liquid electrolyte, the liquid electrolyte penetrates between active material particles to form a reaction interface. In contrast, when a solid electrolyte is used for the electrolyte, the solid electrolyte has no penetration mechanism between such active material particles, and therefore it is necessary to mix a powder containing the electrode active material particles and a powder of the solid electrolyte in advance. Therefore, the positive electrode of an all-solid-state lithium ion battery s usually a mixture of the positive electrode active material powder and the solid electrolyte.

However, in the all-solid-state lithium ion battery, resistance generated when lithium ions migrate at an interface between the positive electrode active material and the solid electrolyte (sometimes referred to as "an interface resistance" hereafter), is likely to be increased. When the interface resistance is increased, a performance such as a battery capacity is deteriorated in the all-solid-state lithium ion battery.

Here, non-patent document 1 discloses that the increase of the interface resistance is caused by a reaction of the positive electrode active material and the solid electrolyte to form a high resistance portion on the surface of the positive electrode active material. Non-patent document 1 also discloses that the interface resistance is reduced by coating the surface of lithium cobalt oxide which is the positive electrode active material, with lithium niobate, to thereby improve the performance of the all-solid-state lithium ion battery.

Non-patent document 2 discloses that the interface resistance is reduced by coating the surface of lithium cobalt oxide with lithium titanate, to thereby improve the performance of the all-solid-state lithium ion battery.

Specifically, non-patent document 2 discloses that an alcohol solution mixed with metal alkoxide such as Nb alkoxide, Ti alkoxide, Li alkoxide or the like is brought into contact with a lithium-metal oxide surface such as lithium cobalt oxide, and thereafter the lithium-metal oxide is baked in the atmosphere, to thereby coat the surface with lithium niobate or lithium titanate.

In contrast, patent document 1 also discloses a method for producing lithium cobaltate coated with lithium niobate. Specifically, an alcohol solution mixed with a metal alkoxide such as Nb ethoxide or Li ethoxide is brought into contact with the surface of lithium cobaltate, and this lithium cobaltate was baked at a relatively low temperature of 260° C. to 300° C. by low-temperature baking, wherein the interfacial resistance of a coating layer is reduced by suppressing a crystallization of lithium cobaltate coated with lithium niobate.

Patent document 2 also discloses a method for producing lithium cobaltate coated with lithium niobate using a solution containing lithium and a niobium complex. The present inventors further disclose in patent documents 3 and 4, a solution containing lithium and a niobium complex which is less likely to form a precipitate and is excellent in storage stability, and a method for producing the same.

PRIOR ART DOCUMENT

Patent Document

Patent Document 1
[Patent Document 1] Japanese Patent Application Laid-Open No. 2010-129190
[Patent Document 2] Patent Document Japanese Patent Application Laid-Open No. 2012-074240
[Patent Document 3] Japanese Patent Application Laid-Open No. 2014-210701.
[Patent Document 4] Japanese Patent Application Laid-Open No. 2015-103321

Non-Patent Document

[Non-Patent Document 1] Electrochemistry Communications, 9 (2007) p. 1486 to 1490
[Non-Patent Document 2] Advanced Materials, 18 (2006) p. 2226 to 2229

SUMMARY OF THE INVENTION

Problem to be Solved by the Invention

As described above, in Patent Documents 3 and 4, the inventors of the present invention disclose a solution containing lithium and a niobium complex which is less likely to form a precipitate and is excellent in storage stability. According to this technique, in a method for forming a lithium niobate compound on the surface of the positive electrode active material by using a niobium complex, a dramatic improvement is achieved in the storage stability of the solution containing the niobium complex which is regarded as an urgent subject.

In the step of forming the niobium complex, ammonia is an essential constituent. Conventionally, it is conceivable that if the amount of ammonia in the solution becomes too small, the niobium complex which is supposed to be originally necessary is changed to insoluble niobium hydroxide, and therefore ammonia is preferably remained in the liquid.

However, it has become clear that excessive ammonia in the solution causes a chemical damage to the active material, which causes deterioration of battery characteristics as a result.

Further, in order to obtain a stable complex in the course of its formation, it is necessary to charge 2 mol or more of ammonia with respect to 1 mol of niobium atoms, but much ammonia will be inevitably remained in the solution as a result. According to a conventional production method, there is no removal step of removing excessive ammonia, and therefore much ammonia is remained in the solution after complex synthesis. Due to a great contribution to a stabilization of the niobium complex, ammonia is not specifically removed originally.

Further, in the reaction step, hydrogen peroxide is added to cause a reaction in some cases. In this case, if the amount of hydrogen peroxide added in the solution is too small, the formed niobium complex is changed to an unintended niobium hydroxide and a coating layer is hardly formed on the active material. Therefore, it has been considered that hydrogen peroxide is preferably remained in the liquid. However, heat generation and foaming due to self-decomposition are sometimes generated from the solution depending on a preservation environment, and it becomes gradually clear that such heat generation and foaming will be obstacles for industrial production and storage, which is possibly a hindrance due to problems such as handling and equipment corrosion.

Here, the problem during handling means that a component of the solution is changed due to decomposition of hydrogen peroxide at the time of liquid transfer or storage, and the problem of corrosion means oxidation and deterioration of materials such as pipes and tanks, There is a high possibility of this problem, as the amount of hydrogen peroxide in solution is increased. That is, handling and corrosion have emerged as a problem due to foaming of hydrogen peroxide which supports the stability of the complex.

However, in the step of forming a peroxo complex of niobium among niobium complexes, although this is an example, hydrogen peroxide is also an essential component. Further, in order to stably obtain the complex in the course of its formation, it is necessary to add 10 mol or more of hydrogen peroxide to 1 mol of niobium atoms, which corresponds to five times or more of the amount of hydrogen peroxide required for forming the niobium complex theoretically. Further, according to a conventional production method, excessive hydrogen peroxide is not removed, and therefore hydrogen peroxide which is not used in the reaction in the solution after complex synthesis, is remained in the reaction solution. Further, hydrogen peroxide itself greatly contributes to the stabilization of the complex, and therefore countermeasures for preventing storage under high temperature environment in order to suppress self decomposition of hydrogen peroxide are taken rather than sacrificing the stabilization of the complex by removing it.

Therefore, the present inventors study on the problem to be solved, and provide a solution containing lithium and at least one of a niobium complex and a titanium complex, capable of suppressing corrosiveness, having excellent storage stability, and suitable for forming a coating layer to improve battery characteristics of the active material.

Means for Solving the Problem

According to the study by the present inventors in order to solve the above problem, there are inventions as follows.

A first invention of the present invention provides a solution containing lithium, at least one of a niobium complex and a titanium complex, and ammonia, wherein an amount of the ammonia in the solution is 1 mass % or less.

A second invention of the present invention provides the solution of the first invention, wherein the metal complex has a peroxy group.

A third invention of the present invention provides the solution of the second invention, wherein a molar ratio of atoms in the lithium to atoms of a metal in the metal complex is 0.8 to 2.0.

A fourth invention of the present invention provides the solution of any one of the first to third inventions, which further contains a reducing compound.

A fifth invention of the present invention provides the solution of the fourth invention, wherein a ratio of the reducing compound in the solution is 0.01 mass % to 5.0 mass %.

A sixth invention of the present invention provides the solution of any one of the first to fifth inventions, wherein the solution further contains hydrogen peroxide therein, and a content of the hydrogen peroxide in the solution is 1 mass % or less.

A seventh invention of the present invention provides a method for producing an active material for a secondary battery, including:

performing a surface treatment using the solution of any one of the first to sixth aspects; and heat-treating the surface-treated active material.

An eighth invention of the present invention provides the method of the seventh invention, wherein the active material is an oxide containing lithium.

A ninth invention of the present invention provides the method of the seventh or the eight invention, wherein the active material is an oxide containing lithium, and at least one of a lithium niobate compound and a lithium titanate compound is attached to a main surface of the active material.

A tenth invention of the present invention provides a method for producing a solution, including:

forming a metal complex in a solution by mixing at least one of niobic acid and titanic acid with ammonia;

mixing the metal complex and a lithium compound in the solution; and removing the ammonia in the mixed solution until an amount of the ammonia is reduced to 1 mass % or less.

An eleventh invention of the present invention provides the method of the tenth invention, further including:

reducing an amount of hydrogen peroxide in the mixed solution to 1 mass % or less.

According to another invention of the present invention, there is provided a method for producing a solution, containing lithium, and a metal complex which is at least one of a niobium complex and a titanium complex, and hydrogen peroxide, in which an amount of the hydrogen peroxide in the solution is 1 mass % or less, the method including:

mixing a hydrogen peroxide with at least one of niobic acid and titanic acid to form a metal complex in a solution;

mixing the metal complex and a lithium compound in the solution; and removing the hydrogen peroxide until an amount of the hydrogen peroxide in the mixed solution is reduced to 1 mass % or less.

Advantage of the Invention

By using an active material having a coating layer formed by using a solution of the present invention, it is possible to obtain a secondary battery having excellent battery characteristics. Further, it is possible to obtain at least one of a niobium complex solution and a titanium complex solution for surface treating (coating) an active material for a secondary battery which is excellent in storage stability, excellent in handling the solution, and excellent in handling property and corrosiveness at the time of storage.

DETAILED DESCRIPTION OF THE INVENTION

Figure 1:
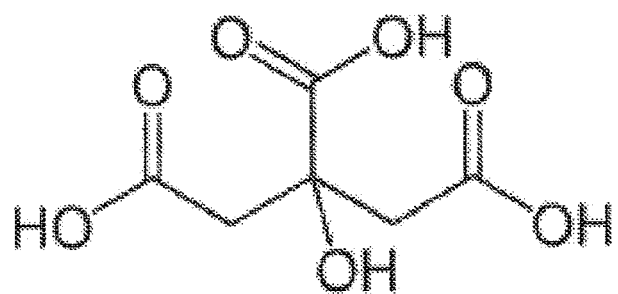
FIG. 1 is a structural formula of citric acid.
Figure 2:
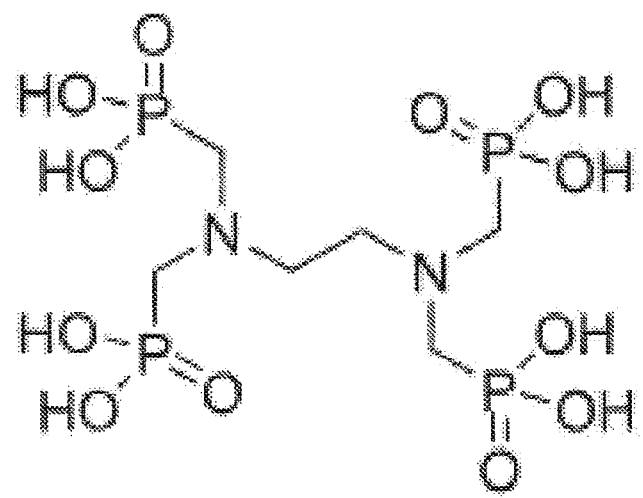
FIG. 2 is a structural formula of EDTMPA.

As a mode for carrying out the present invention, explanation will be given for a solution containing lithium and a niobium and/or titanium complex, a form of a complex in the solution, a component to be added to the solution, a post-treatment method performed to the solution, lithium-metal oxides such as lithium cobaltate coated with lithium niobate and/or lithium titanate using the obtained solution, and a method for producing the same, respectively.

"A and/or B" means at least any one of A and B hereafter. Particularly, the niobium complex and/or the titanium complex are sometimes simply referred to as "a metal complex". Further, "to" means that it is not less than a predetermined numerical value and not more than a predetermined numerical value in this specification.

(A Solution Containing Lithium and the Niobium Complex and/or the Titanium Complex)

The solution containing lithium and the niobium complex and/or the titanium complex (metal complex) of the present invention, can be obtained by mixing a solution containing a water-soluble metal complex with a lithium compound such as lithium salt.

(Niobium Complex and/or Titanium Complex)

A ligand of the niobium complex and/or the titanium complex may be any one as long as the complex becomes soluble in water, and further, when a surface coat layer is formed, it is preferable to select the ligand which does not generate residual carbon that causes deterioration of battery characteristics. When a material containing carbon in the metal complex is selected, it is preferable to select the material having a property that the metal complex is desorbed from the active material, in the step of performing surface treatment to the active material for a secondary battery described later using the solution of the present invention to form a coating layer on a main surface of the active material, and thereafter heat-treating (baking) the active material in the atmosphere. More specifically, it is preferable to select the material having a property that the complex is decomposed during baking. Accordingly, although sometimes influenced by baking conditions, it is preferable to select niobium complex and/or titanium complex having a property of being decomposed at 750° C. or less, preferably 650° C. or less, more preferably 300° C. or less.

The abovementioned niobium complex and/or titanium complex preferably has a peroxy group. The peroxo complex does not contain carbon in its chemical structure, and therefore when the surface coating layer of the positive electrode active material is formed via such a complex, it is not influenced by a baking temperature, and a carbon residue such as causing deterioration of battery characteristics is not generated, which is preferable.

The peroxo complex of niobium and/or titanium can be prepared, for example, by the following method. Patent Document 4 may be referred to for contents not included below. The term peroxo complex as referred to herein refers to one having a peroxy group (—O—O—) bonded to niobium and/or titanium. However, all of the ones bonded to niobium and/or titanium are not required to be peroxy groups, and for example most of those bonded to niobium and/or titanium may be peroxy groups, while some may remain oxygen (oxy group).

The peroxo complex of niobium is obtained by adding ammonia water to niobic acid (diniobium pentoxide hydrate) and further adding hydrogen peroxide. When the peroxo complex of niobium is prepared, an excessive amount of ammonia water is added, for example, at a molar ratio of 2 mol or more, preferably 3 mol or more, with respect to 1 mol of the niobium atom.

When the peroxo complex of niobium is prepared, it is preferable that an excessive amount of hydrogen peroxide is added to niobic acid. Specifically, hydrogen peroxide is at least 10 moles, preferably at least 30 moles, more preferably at least 50 moles, per 1 mole of niobium atom in molar ratio. With this molar ratio, it is possible to inhibit hydrolysis of the peroxo complex from predominating, although the peroxo complex is supposed to be prepared, and a desired niobium peroxo complex can be surely obtained, which is preferable.

In contrast, when the peroxo complex of titanium is prepared, the peroxo complex is obtained by adding ammonia water to metal titanium (which may be powder or foil) and further adding hydrogen peroxide. When the peroxo complex of niobium is prepared, an excessive amount of ammonia water is added, for example, at a molar ratio of 2 moles or more, preferably 3 moles or more, per 1 mole of the titanium atom. In the same manner as niobic acid, it is preferable to add an excessive amount of hydrogen peroxide. Specifically, the ratio of hydrogen peroxide is 10 moles or more, preferably 30 moles or more, more preferably 50 moles or more of hydrogen peroxide per 1 mole of titanium.

By the above method, the peroxo complex of niobium and/or titanium can be obtained. The solution containing the peroxo complex is transparent.

(Lithium Compound)

By adding a lithium compound to an aqueous solution containing the metal complex obtained by the abovementioned method, a solution containing lithium and the metal complex can be completed. The number of moles of lithium of the lithium compound to be added can be arbitrarily set with respect to the number of moles of niobium and/or titanium in the metal complex contained in the aqueous solution.

However, preferably an amount of lithium atoms is preferably in a range of 0.8 to 2.0 moles, per 1 mol of niobium and/or titanium atoms.

When the amount of lithium is a lower limit value or more with respect to the amount of niobium and/or titanium, lithium conductivity of lithium niobate and/or lithium titanate obtained from the metal complex can be maintained at an appropriate value. When the amount of lithium is an upper limit value or less with respect to the amount of niobium and/or titanium, this is appropriate because it is unnecessary to have excessive lithium not involved in lithium conductivity.

As a preferable example of the lithium compound to be added, inorganic lithium salts such as lithium hydroxide (LiOH), lithium nitrate ($LiNO_3$), lithium sulfate ($Li_2SO_4$) and lithium carbonate ($Li_2CO_3$), etc., can be used.

(Other Additives)

In order to further improve the stability of the metal complex, it is preferable to add a stability improver which is a reducing compound, to the solution of the present invention (see, for example, the stability improver in Patent Document 4). A structure in which carboxylic acids, dicarboxylic acids, hydroxycarboxylic acids, and phosphonic acids are added as the stability improver is also a preferable form. It is conceivable that the carboxylic acid has a —COOH group and is bonded to the niobium complex at one site. Preferable examples of the carboxylic acid include formic acid and acetic acid.

The dicarboxylic acid has two —COOH groups, and the hydroxycarboxylic acid has —OH group and —COOH group. Then, it is conceivable that these groups are bonded to the niobium complex and/or the titanium complex at one or two or more sites, Oxalic acid ($(COOH)_2$) is used as the dicarboxylic acid, and citric acid ($C_6H_8O_7$, structural formula is shown in FIG. 1) which is a hydroxy tricarboxylic acid and malic acid ($HOOC—CH(OH)—CH_2COOH$) which is a hydroxydicarboxylic acid are used as the hydroxycarboxylic acid, as preferable examples.

Similarly, compounds such as phosphonic acids having two or more groups capable of bonding to the metal complex (particularly niobium complex) are effective. The phosphonic acids can be bonded to the niobium complex at one or two or more sites depending on the number of groups capable of bonding to the niobium complex. EDTA (($HOOCCH_2)_2$ $NCH_2CH_2N(CH_2COOH)_2$) and EDTMPA (Ethylene Diamine Tetra (Methylene Phosphonic Acid), which is shown in FIG. are used as preferable examples of the phosphonic acid.

As the stability improver which can be added to the solution of the present invention, the group bonded to the abovementioned metal complex includes a carboxyl group, an alcoholic hydroxyl group, a phosphino group, and an amino group, etc. In the stability improver of the present invention, O (oxygen), N (nitrogen), and P (phosphorus) are bonded to the metal complex. Then, it is conceivable that the stability improver of the present invention is positioned so as to surround the metal complex to stabilize the metal complex.

Further, when the stability improver which can be added to the solution of the present invention is a chelate compound having these groups in the molecular structure in a complex manner, it is conceivable that it coordinates with niobium and/or titanium in the metal complex, and an effect of improving stability can be expected, which is preferable.

The present invention has a great characteristic when in the solution containing lithium and the abovementioned metal complex, the residual amount of ammonia is 1 mass % or less but more than zero. The residual amount of ammonia is inversely correlated with the battery characteristics, and the higher the concentration is, the worse the battery characteristics are. Battery characteristics of the active material can be measured either in an all solid state battery or a Li ion battery, as shown in the items of the examples below. Any type of electrolyte or negative electrode is acceptable as long as it can measure the battery characteristics of the active material. Conveniently, Li foil is used for the negative electrode, and $LiPF_6$ dissolved in an organic solvent is used as an electrolyte, and the battery characteristics can be measured by preparing a half cell. As the battery characteristics to be handled, a value (referred to as a change rate) obtained by dividing a discharge capacity B at the time of discharging at a high rate (3C) by a discharge capacity A at the time of discharging at a low rate (0.1C) may be used. The larger the value is, the more smoothly the exchange of the lithium ion of the active material is carried out, which means that resistance of the battery is low.

Here, in view of a relationship between the residual amount of ammonia and the battery characteristics, the residual amount of ammonia is set to 1 mass % or less (preferably 0.5 mass % or less, more preferably 0.3 mass/or less) in the present invention. In this manner, deterioration of the battery characteristics in a case of a coating applied to the active material is of such a level that no practical problem occurs.

Further, when the metal complex is the niobium peroxo complex and/or or the titanium peroxo complex, hydrogen peroxide will be added to prepare the peroxo complex. However, decomposition of hydrogen peroxide is sometimes promoted by ammonia in a storage environment at a high temperature exceeding 40° C. Therefore, by reducing the amount of ammonia in the solution containing the metal complex, decomposition of hydrogen peroxide by ammonia can be reduced, and a stable solution can be obtained even at a high temperature.

Ammonia is decomposed by, for example, an ion exchange method, reduced pressure, heating, or catalyst (nickel or platinum group catalyst) so that the residual amount of ammonia becomes 1 mass %, and the residual amount of ammonia can be appropriately changed. Particularly, when ammonia is removed by ion exchange, the above methods are preferable because they are relatively inexpensive methods. These methods are not limited to one kind, and may be performed in combination.

The ion exchange method includes a method using an ion exchange resin and a method using zeolite, and either one of them may be selected. However, it is preferable to select an adsorbent excellent in ammonia selectivity. As zeolite excellent in ammonia selectivity, clinoptilolite (Ca, $Na_2$) $[Al_2Si_7O_{18}]\cdot16.H_2O$ or mordenite (Ca, $K_2$, $Na_2$) $[AlSi_5O_{12}]_2\cdot7H_2O$, etc., are known. Among them, especially clinoptilolite has excellent ammonia adsorption performance.

However, when the amount of ammonia is too small, the abovementioned metal complex becomes unstable. This is attributed to the fact that the peroxy group of the metal complex is decomposed by hydrolysis and is likely to release hydroxyl ions. On the other hand, when the concentration of ammonia in the solution containing the metal complex is high to some extent, it is conceivable that the metal complex can be stabilized because the hydroxyl ion concentration can be made moderately high.

As described above, the above metal complex is extremely unstable in a transient state during preparation of a complex, and it is necessary to suppress a hydrolysis reaction of the complex in the presence of excessive ammonia. However, the excessive ammonia as much as the amount of the ammonia at the time of preparing the metal complex, is not required for the metal complex to which lithium is added. However, residual ammonia is required to such an extent that stability of lithium-containing niobium and/or titanium complex can be secured.

The residual amount (mass %) of ammonia in the solution at that time is preferably 10 ppb or more, more preferably 1 ppm or more, still more preferably 10 ppm or more. Of course, the abovementioned condition of 1 mass % or less is required to be satisfied. With the residual amount (concentration) in this range, there is almost no decomposition of hydrogen peroxide by ammonia, which contributes to the stability of the peroxo complex of niobium and/or titanium containing lithium.

The amount of ammonia contained in the solution can be obtained, for example, by ion chromatography or absorbance method, a titration method, or the like.

Then, in the present invention, in addition to the abovementioned liquid composition, the residual amount of hydrogen peroxide is preferably 1 mass % or less. The autolysis rate of hydrogen peroxide is proportional to the concentration of hydrogen peroxide in the liquid, and the higher the concentration is, the faster the decomposition rate is. Based on such a knowledge, the residual amount of hydrogen peroxide in the solution is set to 1 mass % or less in the present invention. In this manner, the self-decomposition rate of hydrogen peroxide is practically negligible when the solution is stored, and consequently it becomes possible to suppress change of the composition of the solution and the corrosion of the equipment due to self-decomposition. Further, as a secondary effect, it becomes possible to use the abovementioned solution also in a case of a coating applied to an active material which is chemically weak against hydrogen peroxide (such as lithium nickelate).

The residual amount of hydrogen peroxide can be appropriately varied, for example so that it is 1 mass % or less in the solution, by decomposing hydrogen peroxide, for example by ultraviolet irradiation or under reduced pressure, or by heating or enzyme (catalase). Particularly, when hydrogen peroxide is decomposed by ultraviolet irradiation, it is conceivable that excessive carbon remaining in the solution can also be decomposed because formation of hydroxyl radicals is promoted, which is preferable. Further, the decomposition of hydrogen peroxide by ultraviolet irradiation is preferable because it has little influence on other compounds. These methods are not limited to one kind, and may be performed in combination.

However, when the amount of hydrogen peroxide is too small, the metal complex becomes unstable. This is attributed to the fact that the peroxy group of the metal complex is easily decomposed by hydrolysis. Specifically, when the concentration of hydrogen peroxide in the solution containing the metal complex is high to some extent, even if the peroxy group is removed from the above niobium complex and/or titanium complex by hydrolysis, the peroxy group is newly supplemented to the coordination site of niobium and/or titanium. As a result, the stability of the niobium complex and/or the titanium complex is maintained. Conversely, when there is little hydrogen peroxide in the solution, there is no way to supplement the decrease due to hydrolysis, and therefore the form of the complex is collapsed, and as a result, niobium hydroxide or the like is formed, and the amount of peroxo complex of niobium in the solution becomes insufficient.

Namely, in a transient state during preparation of the complex, the peroxo complex related to the present invention becomes extremely unstable, and it is necessary to suppress the hydrolysis reaction of the complex in the presence of a large amount of excessive hydrogen peroxide. However, the stability of the metal complex is improved, and therefore excessive ammonia as much as the amount of the ammonia at the time of preparing the metal complex, is not required. However, it is necessary to ensure that hydrogen peroxide remains to the extent that stability of niobium and/or titanium complex containing lithium can be secured.

According to the study of the present inventors, it is found that the abovementioned effect is exhibited by allowing 1 mass % or less, preferably 10 ppb or more, more preferably 1 ppm or more, still more preferably 10 ppm or more of hydrogen peroxide to be remained in the solution at that time. With the residual amount (concentration) in this range, there is almost no self-decomposition of hydrogen peroxide, and the stability of the peroxo complex of niobium and/or titanium containing lithium is ensured.

An amount of hydrogen peroxide contained in the solution is obtained by, for example Ti-PAR absorption spectrometry, titration method using potassium permanganate or iodine, voltammetric method, and Post-column HPLC method using chemiluminescence detector.

Further, the peroxy group in the peroxo complex of niobium and/or titanium containing lithium can be confirmed by presence or absence of a peak derived from the O—O bond in the vicinity of 880 $cm^{-1}$ when for example a precipitate (crystal of lithium and a niobium complex and/or a titanium complex) obtained by adding 10 g of a solution into 100 ml of isopropanol, is measured by a Fourier transform infrared absorption spectrum measuring apparatus or a Raman spectroscopic apparatus.

<Method for Adding Stability Improver Into Solutions Containing Lithium and Niobium Complex and/or Titanium Complex>

As a method for adding a substance which further induces the effect of improving stability of a solution containing lithium and niobium and/or a titanium complex, citric acid monohydrate which is hydroxytricarboxylic acid will be explained as an example. Citric acid monohydrate ($C_6H_8O_7 \cdot H_2O$) may be added into 5.0 mass % to the abovementioned aqueous solution containing lithium and niobium complex, in an amount of 0.01 mass % to 5.0 mass %.

Here, as the form of citric acid to be added, citric acid anhydride can be used in addition to monohydrate. However, from the viewpoint of solubility in water, it is preferable to use citric acid monohydrate having high solubility.

When the addition amount is 0.01 mass % or more, the effect of improving the stability can be obtained. In contrast, when the addition amount is 5 mass % or less, it is possible to obtain adequate content of C (carbon) which becomes an impurity in the subsequent step while exerting the effect of improving the stability.

As described above, a stability improver such as citric acid monohydrate (hydroxytricarboxylic acid) may be added into the solution containing lithium and niobium and/or a titanium complex. Effective stability improvers are not particularly limited to citric acid, and may include carboxylic acids, dicarboxylic acids, other hydroxycarboxylic acids, and phosphoric acids exemplified as described above, in the same manner as a case of using citric acid monohydrate.

(Storage Stability of the Solution Added with a Stability Improver and Containing Lithium, Niobium Complex and/or Titanium Complex)

It is confirmed by the inventors of the present invention that the solution of the present invention added with a stability improver and containing lithium, niobium complex and/or titanium complex, has excellent storage stability in which no precipitate is formed even if being left standing for 12 hours or more after production.

As a result, when surface treatment is performed to the active material (lithium-metal oxide such as lithium cobalt oxide or the like) for the secondary battery using the above solution, and coating, namely, a step of applying the lithium niobate compound and/or the lithium titanate compound to the main surface of the active material is performed, a coating amount of lithium niobate and/or lithium titanate can be insured and control becomes easy. Then, it is also possible to avoid problems such as mixing of the precipitate into the active material for the secondary battery coated with the lithium niobate and/or the lithium titanate. Further, there is less necessity to start the process of coating the active material for the secondary battery within a certain period of time after preparing the solution, and the production efficiency can be improved.

Active materials such as lithium nickel oxide ($LiNiO_2$) lithium manganate ($LiMnO_4$), ($LiNi_{0.95}Al_{0.05}O_2$ and the like) in which a part of transition metals of these active materials are substituted with Al, Ti, Cr, Fe, Zr, W, Ta, and active materials ($LiNi_{1/3}Co_{1/3}Mn_{1/3}O_2$, $LiNi_{0.5}Co_{0.2}Mn_{0.3}O_2$, $LiNi_{0.8}Co_{0.15}Al_{0.05}O_2$, $LiNi_{0.5}Mn_{1.5}O_4$, etc.) obtained by combining the above active materials, can be used for the active material for a secondary battery, other than lithium cobalt oxide ($LiCoO_2$).

(Baked Lithium-Metal Oxide After its Surface is Coated with a Solution Containing Lithium and Niobium and/or a Titanium Complex to Which a Stability Improver Has Been Added)

The active material for constituting a secondary battery is coated with a solution containing lithium and niobium complex and/or titanium complex stabilized by adding citric acid monohydrate or the like, and thereafter an appropriate heat treatment (for example, baking) is applied thereto, to thereby decompose a component containing elements such as C, N, S and P in the additive and remove it to such an extent that practically no problem is caused.

As a method for coating the active material with the solution, a publicly-known method can be used, such as a method for spraying a solution on an active material, a method for immersing an active material in a solution to dry it, and a method for dispersing an active material in an organic solvent and adding the solution thereinto.

After decomposition, the surface of the active material is coated with lithium composite oxide of titanium and/or niobium. Presence or absence of these oxides can be confirmed, for example, by cutting the particle into a cross section and observing the segregation of titanium and/or niobium on the particle surface part using SEM-EDX.

As a result, even when the positive electrode active material for constituting a secondary battery coated with the solution is used as the positive electrode material of the lithium ion battery, it is possible to avoid influencing the battery characteristics.

Accordingly, the lithium-metal oxide baked after the surface is coated with the solution containing lithium and niobium and/or titanium complex to which the stability improver of the present invention is added, is suitable as a positive electrode active material of the secondary battery.

Although the metal complex having a peroxy group has been mentioned as a preferable example, the stability of the metal complex can be secured to some extent as long as the above stability improver is added, even if the metal complex does not have a peroxy group. In this case, the residual amount of ammonia can be reduced to 1 mass % or less while allowing ammonia to be remained in the solution without excessively impairing the stability.

As described above, embodiments of the present invention have been described. However, the present invention is not limited in any way to the abovementioned embodiment, and can be variously modified within the scope not deviating from the gist of the present invention.

EXAMPLES

Examples of the present invention and comparative examples will be described hereafter.

In the following, the amounts of ammonia in the examples and comparative examples were measured by ion chromatography (ICS-3000 type). IonPac CS 14 was used as a cation molecule column and 10 mmol/L of metasulfonic acid (both produced by Dionex Corporation) was used as an eluent.

Further, a spectrophotometric device manufactured by Hitachi High-Technologies Corporation was used for measuring the amount of hydrogen peroxide. The measurement was performed as follows: quantitative analysis of $H_2O_2$ in the test solution was performed by measuring intensity at a measurement wavelength of 520 nm and obtaining a relative intensity with respect to a standard solution of $H_2O_2$, using Ti-PAR absorption photometric method.

Further, regarding the presence or absence of the peroxy group in the niobium complex and/or the titanium complex of the examples and comparative examples, the presence of the peroxy group in all the examples and comparative examples was confirmed by confirming the presence or absence of a peak derived from the O—O bond near 880 $cm^{-1}$ when 10 g of the solution was added into 100 ml of isopropanol and the obtained precipitate (crystals from lithium and niobium complex and/or titanium complex) was measured using a Fourier transform infrared absorption spectrum analyzer (NICOLET 6700 instrument manufactured by Thermo SCIENTIFIC).

Comparative Example 1

A hydrogen peroxide aqueous solution was prepared, in which 20.0 g of hydrogen peroxide water having a concentration of 30 mass % was added to 33.5 g of pure water. 2.01 g of niobic acid ($Nb_2O_5 \cdot 5.5H_2O$ (72.6% content of $Nb_2O$) was added to the hydrogen peroxide aqueous solution. After addition of the niobic acid, the temperature of the liquid to which the niobic acid was added was adjusted so that the liquid temperature was within a range of 20° C. to 30° C. To this liquid to which niobic acid was added, 3.3 g of aqueous ammonia having a concentration of 28 mass % was added and sufficiently stirred to thereby obtain a transparent solution.

In a nitrogen gas atmosphere, 0.46 g of lithium hydroxide monohydrate ($LiOH \cdot H_2O$) was added to the obtained transparent solution, to thereby obtain a transparent aqueous solution containing lithium and a peroxo complex of niobium.

Thereafter, when the aqueous solution containing lithium and a niobium complex was allowed to stand at a temperature of 25° C. and the presence or absence of foaming was visually confirmed, some foaming was observed, and it was considered that hydrogen peroxide decomposition was generated in the solution. Thereafter, the aqueous solution containing lithium and a niobium complex was allowed to stand at a temperature of 25° C. for a predetermined time (6 hours to 168 hours), and whether or not a precipitate was formed was visually confirmed. As a result, a precipitate was formed by standing for about 6 hours. When the precipitate was formed, the liquid was stirred to such a degree that the precipitate was dispersed, and thereafter filtration was performed using a membrane filter having a pore size of 0.5 µm, to thereby obtain the solution containing lithium and a peroxoniobic acid complex. At this time, an amount of ammonia (residual NH; content) in the solution was 1.5 mass %. Further, an amount of hydrogen peroxide in the solution (amount of residual $H_2O$) was 3 mass %.

Example 1

4 g of zeolite (Itaja zeolite Z-13 manufactured by Sieglite Co.) was added to a transparent aqueous solution containing lithium and a peroxo complex of niobium (before being allowed to stand at 25° C. for a predetermined time) in which lithium hydroxide monohydrate was mixed, and the mixture was stirred for 30 minutes and centrifuge filtered, to thereby obtain a solution in which ammonium ions in the solution were removed (ammonia was removed). The amount of ammonia was measured in the same manner as comparative example 1. At this time, the amount of ammonia was 0.3 mass % (the moisture adsorbed on the zeolite was supplemented with pure water, and adjusted to the same weight of the solution before the removal treatment), The amount of residual $H_2O_2$ was 3 mass %.

Unlike a colloidal solution (sol solution), this solution was a transparent solution in which Tyndall phenomenon due to scattered light was not observed. When the aqueous solution containing lithium and a niobium complex was allowed to stand at a temperature of 25° C. and the presence or absence of foaming was visually confirmed, some foaming was observed, and it was considered that hydrogen peroxide decomposition was generated in the solution. Also, even after storing this solution at 25° C. for 1 month, turbidity of the solution or formation of precipitate due to decomposition of the niobium complex was not observed, and the solution was remained to be a clear solution.

The solution immediately after the ammonium ion was removed in this way, was sprayed for 2 hours by misting, while 100 g of nickel cobalt lithium manganate powder ($LiNi_{0.5}Co_{0.2}Mn_{0.3}O_2$ MTI particle size 13 µm, BET 0.353 m²/g) as an active material for a secondary battery was heated to 100° C., and thereafter dried in the air at 100° C. for 6 hours. Thereafter, baking was performed at 300° C. for 1 hour, to thereby obtain an active material for a secondary battery to which surface treatment was applied.

<Details of Chemical Analysis>

As a result of analyzing the niobium content in the active material of example 1 by ICP, the niobium content was 0.96 mass %. Since a theoretical value of the niobium content was 1.00 mass %, when assuming that the niobium complex was entirely adhered to the active material as lithium niobate ($LiNbO_3$), an adhesion yield was calculated to be 96%, and it was confirmed that almost all the niobic acid complex was adhered to the active material surface.

Figure 3A:
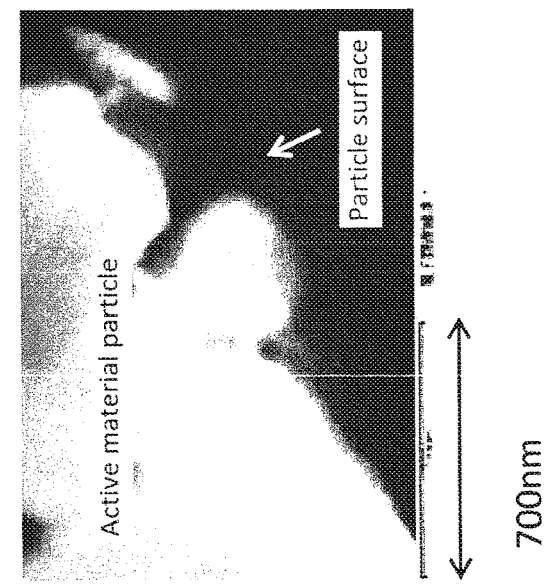
FIG. 3 (a) is a photograph showing a result of SEM observation of a cross section of a particle constituting the active material, FIG. 3 (b) is a view showing a result of Co (cobalt) element mapping for the active material, and FIG. 3 (c) is a view showing a result of Nb (niobium) element mapping.
Figure 3B:
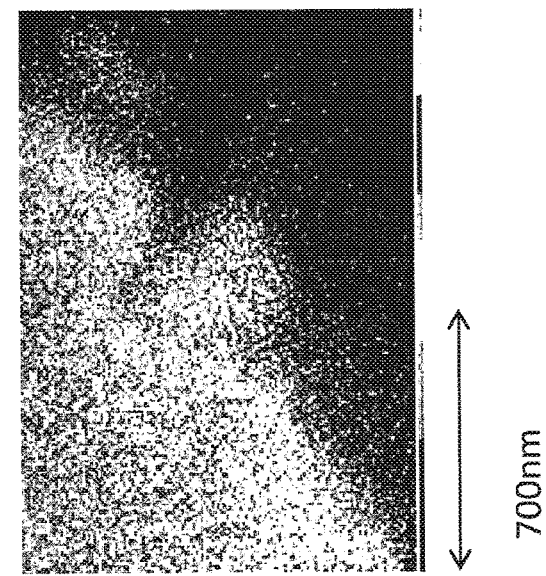
Figure 3C:
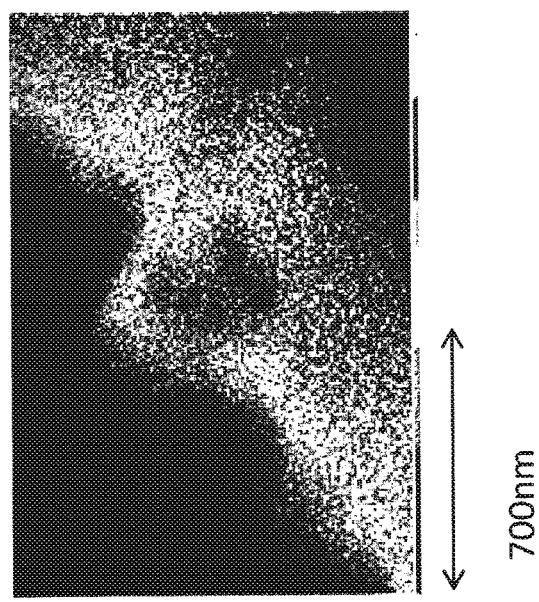

FIG. 3 shows results of various observations performed to the active material of example 1 in which the niobic acid complex was adhered to the surface of the active material. FIG. 3 (a) is a photograph showing the result of SEM observation (SEM-EDX, apparatus JSM-7800 F manufactured by JEOL Ltd.) performed to a cross section of a particle constituting the active material, and it was confirmed that coating was performed to the active material. FIG. 3 (b) is a view showing the results of Co (cobalt) element mapping (apparatus ISM-7800F manufactured by JEOL Ltd.) over the active material, and FIG. 3 (c) is a view showing the results of Nb (niobium) element mapping (the same apparatus). From both figures, it was confirmed that niobium was surely adhered (applied) to the active material which was lithium cobalt oxide.

Further, the battery characteristics were evaluated in the following manner.

As a positive electrode material, 2.67 ml of N-methyl-2-pyrrolidone (NMP) was mixed in 1.88 g of the sample powder (positive electrode active material) and 0.12 g of acetylene black (manufactured by Denki Kagaku Kogyo Co., Ltd.), and the mixture was stirred for 5 minutes using a homogenizer. Next, 0.33 ml of a 12 wt % PVDF/NMP solution (#1100) (manufactured by Kishida Chemical Co., Ltd.) was mixed and the mixture was stirred for 5 minutes using the homogenizer, to thereby obtain a positive electrode slurry. The positive electrode slurry was applied on an aluminum foil, using an applicator having a slit width of 200 microns. This aluminum foil was dried at 90° C. for 1 hour using a hot plate and further dried at 120° C. for 6 hours in a vacuum dryer. The obtained positive electrode was pressed with a pressure molding machine and used. At this time, a thickness of the positive electrode layer was 50 µm.

Metal lithium was used as a negative electrode, and a solution obtained by dissolving 1 mol/L of lithium hexafluorophosphate ($LiPF_6$) as an electrolyte in a solvent in which ethylene carbonate (EC) and dimethyl carbonate (DMC) were mixed at a volume ratio of 1:2, was used as an electrolytic solution.

As described above, as the battery characteristics, the value (change rate) obtained by dividing a discharge capacity B at the time of discharging at a high rate (3C) by a discharge capacity A at the time of discharging at a low rate (0.1C), was used. The larger this value is, the more smoothly the exchange of lithium ions of the active material is performed, which means that battery resistance is low. In example 1, the discharge capacity A was 155 mAh/g, the discharge capacity B was 11.0 mAh/g, and the change rate was 71%.

As a result of the same chemical analysis also in comparative example 1, the discharge capacity A was 145 mAh/g, the discharge capacity B was 80 mAh/g, and the change rate was 55%, and the battery characteristics were clearly inferior to those of example 1.

Hereinafter, the results of each example and each comparative example are summarized in table 2 (described later).

Example 2

A solution was obtained, containing lithium and a peroxo complex of niobium obtained in example 1, in which ammonia was removed and citric acid was added by adding 0.0059 g (0.01 wt %) of citric acid monohydrate (reducing compound or stability improver) while stirring the aqueous solution from which excessive ammonia was removed. At this time, the amount of residual $NH_3$ in the solution was 0.3 mass %, and the amount of residual $H_2O_2$ was 3 mass %.

As a result of examining the battery characteristics in the same manner as in example 1, in example 2, the discharge capacity A was 155 mAh/g, the discharge capacity B was 110 mAh/g, and the change rate was 71%. The change rate was equivalent to that of example 1.

Further, even in this solution, when the aqueous solution containing lithium and a niobium complex was allowed to stand at a temperature of 25° C. and the presence or absence of foaming was visually confirmed, some foaming was observed, and it was considered that hydrogen peroxide decomposition was generated in the solution. In addition, even after storage at 25° C. for 1 month, no precipitate was formed due to decomposition of the niobium complex.

Example 3

Example 1 was repeated except that the amount of zeolite was reduced to 2 g. The amount of residual $NH_3$ in the obtained solution was 1 mass %, and the amount of residual $H_2O_2$ was 3 mass %. In the same manner as in example 1, when the aqueous solution containing lithium and a niobium complex was allowed to stand at a temperature of 25° C. and the presence or absence of foaming was visually confirmed, some foaming was observed, and it was considered that hydrogen peroxide decomposition was generated in the solution. In addition, even after storage at 25° C. for 1 month, no precipitate was formed due to decomposition of the niobium complex.

As a result of examining the battery characteristics in the same manner as in example 1, in example 3, the discharge capacity A was 150 mAh/g, the discharge capacity B was 110 mAh/g, and the change rate was 67%. Although the change rate was slightly lower than in example 1, sufficient characteristics were shown for practical use.

Example 4

Example 1 was repeated except that the amount of zeolite was increased to 5 g. The amount of residual $NH_3$ in the obtained solution was 0.05 mass %, and the amount of residual $H_2O_2$ was 3 mass %. In the same manner as in example 1, when the aqueous solution containing lithium and a niobium complex was allowed to stand at a temperature of 25° C. and the presence or absence of foaming was visually confirmed, some foaming was observed, and it was considered that hydrogen peroxide decomposition was generated in the solution. In addition, even after storage at 25° C. for 1 month, no precipitate was formed due to decomposition of the niobium complex.

As a result of examining the battery characteristics in the same manner as in example 1, in example 4, the discharge capacity A was 155 mAh/g, the discharge capacity B was 115 mAh/g, and the change rate was 74%. The change rate was further improved as compared with example 1.

Example 5

Example 1 was repeated except that the amount of zeolite was further increased to 6 g. The amount of residual $NH_3$ in the obtained solution was 0.008 mass %, and the amount of residual $H_2O_2$ was 3 mass %. In the same manner as in example 1, when the aqueous solution containing lithium and a niobium complex was allowed to stand at a temperature of 25° C. and the presence or absence of foaming was visually confirmed, some foaming was observed, and it was considered that hydrogen peroxide decomposition was generated in the solution. In addition, even after storage at 25° C. for 2 months, no precipitate was formed due to decomposition of the niobium complex.

As a result of examining the battery characteristics in the same manner as in example 1, in example 5, the discharge capacity A was 155 mAh/g, the discharge capacity B was 120 mAh/g, and the change rate was 77%. The change rate was equal to or better than that of example 4.

Comparative Example 2

A hydrogen peroxide aqueous solution was prepared, in which 16.0 g of hydrogen peroxide water having a concentration of 30 mass % was added to 19.7 g of pure water. 0.53 g of metal titanium powder was added to the hydrogen peroxide aqueous solution. After addition of the metal titanium powder, the temperature of the liquid to which the metal titanium powder was added was adjusted so that the liquid temperature was within a range of 20° C. to 30° C. To this liquid to which the metal titanium powder was added, 2.4 g of aqueous ammonia having a concentration of 28 mass % was added and sufficiently stirred, to thereby obtain a transparent solution.

In a nitrogen gas atmosphere, 0.38 g of lithium hydroxide monohydrate ($LiOH.H_2O$) was added to the obtained transparent solution, to thereby obtain a transparent aqueous solution containing lithium and a peroxo complex of titanium.

Thereafter, when the aqueous solution containing lithium and a titanium complex was allowed to stand at a temperature of 25° C. and the presence or absence of foaming was visually confirmed, some foaming was observed, and it was considered that hydrogen peroxide decomposition was generated in the solution. Thereafter, the aqueous solution containing lithium and a niobium complex was allowed to stand at a temperature of 25° C. for a predetermined time (6 hours to 168 hours), and whether or not a precipitate was formed was visually confirmed. As a result, a precipitate was formed by standing for about 6 hours. When the precipitate was formed, the liquid was stirred to such a degree that the precipitate was dispersed, and thereafter filtration was performed using a membrane filter having a pore size of 0.5 μm, to thereby obtain the solution containing lithium and a peroxotitanic acid complex. At this time, an amount of the residual $NH_3$ was 0.008 mass % and an amount of residual $H_2O_2$ was 3 mass % in the solution.

Example 6

4 g of zeolite (Raja zeolite Z-13 manufactured by Sieglite Co.) was added to a transparent aqueous solution containing lithium and the peroxo complex of titanium (before being allowed to stand at 25° C. for a predetermined time) in which 0.38 g of lithium hydroxide monohydrate ($LiOH.H_2O$) was mixed, and the mixture was stirred for 30 minutes and centrifuge filtered, to thereby obtain a solution in which ammonium ions in the solution were removed (ammonia was removed). At this time, the amount of residual $NH_3$ was 0.5 mass % (the water adsorbed on zeolite was supplemented with pure water, and adjusted to the same weight as the solution before the removal treatment). The amount of residual $H_2O_2$ was 3 mass %.

Unlike a colloidal solution (sol solution), this solution was a transparent solution in which Tyndall phenomenon due to scattered light was not observed. When the aqueous solution containing lithium and a niobium complex was allowed to stand at a temperature of 25° C. and the presence or absence of foaming was visually confirmed, some foaming was observed, and it was considered that hydrogen peroxide decomposition was generated in the solution. Also, even after storing this solution at 25° C. for 1 month, turbidity of the solution or formation of precipitate due to decomposition of the niobium complex was not observed, and the solution was remained to be a clear solution.

Further, as a result of examining the battery characteristics in the same manner as in example 1, in example 6, the discharge capacity A was 150 mAh/g, the discharge capacity B was 100 mAh/g, and the change rate was 67%.

In contrast, in the solution (comparative example 2) in which the excessive ammonia removal treatment was not performed, the discharge capacity A was 140 mAh/g, the discharge capacity B was 70 mAh/g, and the change rate was 50%, and the battery characteristics were clearly inferior to those of example 6.

Example 7

After the ammonium ion was removed in example 1, a sample was prepared in the same manner as in example 1 except that excessive hydrogen peroxide in the solution was removed by irradiating it with ultraviolet light (UV-LED device manufactured by Eye Graphics Co., Ltd., wavelength: 365 nm) for 60 minutes. At this time, an amount of the residual $NH_3$ content in the solution was 0.2 mass %. Further, an amount of residual $H_2O_2$ content in the solution was 20 ppm.

Compared with examples 1 to 6 and comparative examples, visual observation was performed and clear foaming was not observed, foaming from the solution could be suppressed, and the precipitate was not formed in the solution over 2 months. Therefore, it was found that the stability of the solution was further improved as compared with example 1. As a result of examining the battery characteristics in the same manner as in example 1, in example 7, the discharge capacity A was 155 mAh/g, the discharge capacity B was 110 mAh/g, and the change rate was 71%. The change rate was equivalent to that of example 1.

Example 8

After the ammonium ion was removed in example 2, a sample was prepared in the same manner as in example 1 except that excessive hydrogen peroxide in the solution was removed by irradiating it with ultraviolet light (UV-LED device manufactured by Eye Graphics Co., Ltd., wavelength: 365 nm) for 60 minutes. At this time, an amount of the residual $NH_3$ content in the solution was 0.2 mass %. Further, an amount of residual $H_2O_2$ content in the solution was 20 ppm.

Compared with examples 1 to 6 and comparative examples, visual observation was performed and clear foaming was not observed, foaming from the solution could be suppressed, and the precipitate was not formed in the solution over 2 months. Therefore, it was found that the stability of the solution was further improved as compared with example 1. As a result of examining the battery characteristics in the same manner as in example 1, in example 7, the discharge capacity A was 155 mAh/g, the discharge capacity B was 110 mAh/g, and the change rate was 71%. The change rate was equivalent to that of example 1.

Example 9

After the ammonium ion was removed in example 4, a sample was prepared in the same manner as in example 1 except that excessive hydrogen peroxide in the solution was removed by irradiating it with ultraviolet light (UV-LED device manufactured by Eye Graphics Co., Ltd., wavelength: 365 nm) for 20 minutes. At this time, an amount of the residual $NH_3$ content in the solution was 0.05 mass %. Further, an amount of residual $H_2O_2$ content in the solution was 0.1% (1000 ppm).

Compared with examples 1 to 6 and comparative examples, visual observation was performed and clear foaming was not observed, foaming from the solution could be suppressed, and the precipitate was not formed in solution over 2 months. Therefore, it was found that the stability of the solution was further improved as compared with example 1. As a result of examining the battery characteristics in the same manner as in example 1, in example 9, the discharge capacity A was 155 mAh/g, the discharge capacity B was 110 mAh/g, and the change rate was 71%. The change rate was equivalent to that of example 1.

Example 10

After the ammonium ion was removed in example 9, a sample was prepared in the same manner as in example 1 except that excessive hydrogen peroxide in the solution was removed by irradiating it with ultraviolet light (UV-LED device manufactured by Eye Graphics Co., Ltd., wavelength: 365 nm) for 60 minutes. At this time, an amount of the residual $NH_3$ content in the solution was 0.02 mass %. Further, an amount of residual $H_2O_2$ in the solution was 20 ppm.

Compared with examples 1 to 6 and comparative examples, visual observation was performed and clear foaming was not observed, foaming from the solution could be suppressed, and the precipitate was not formed in the solution over 2 months. Therefore, it was found that the stability of the solution was further improved as compared with example 1. As a result of examining the battery characteristics in the same manner as in example 1, in example 10, the discharge capacity A was 155 mAh/g, the discharge capacity B was 110 mAh/g, and the change rate was 74%. It was found that the change rate was further improved as compared with that of example 1.

Table 1 below summarizes the test conditions before addition of zeolite (and before ultraviolet irradiation) in each example and each comparative example, and Table 2 below summarizes the test conditions of addition of zeolite (at the time of ultraviolet irradiation) and the results thereof.

TABLE 1

| *1 . . . Addition amount of citric acid |
|---|

TABLE 2

| *1 . . . Ultraviolet irradiation |
|---|
| *2 . . . Discharge capacity A |
| *3 . . . Discharge capacity B |
| *4 . . . Absent over 1 month |
| *5 . . . Absent over 2 month |

Figure 4:
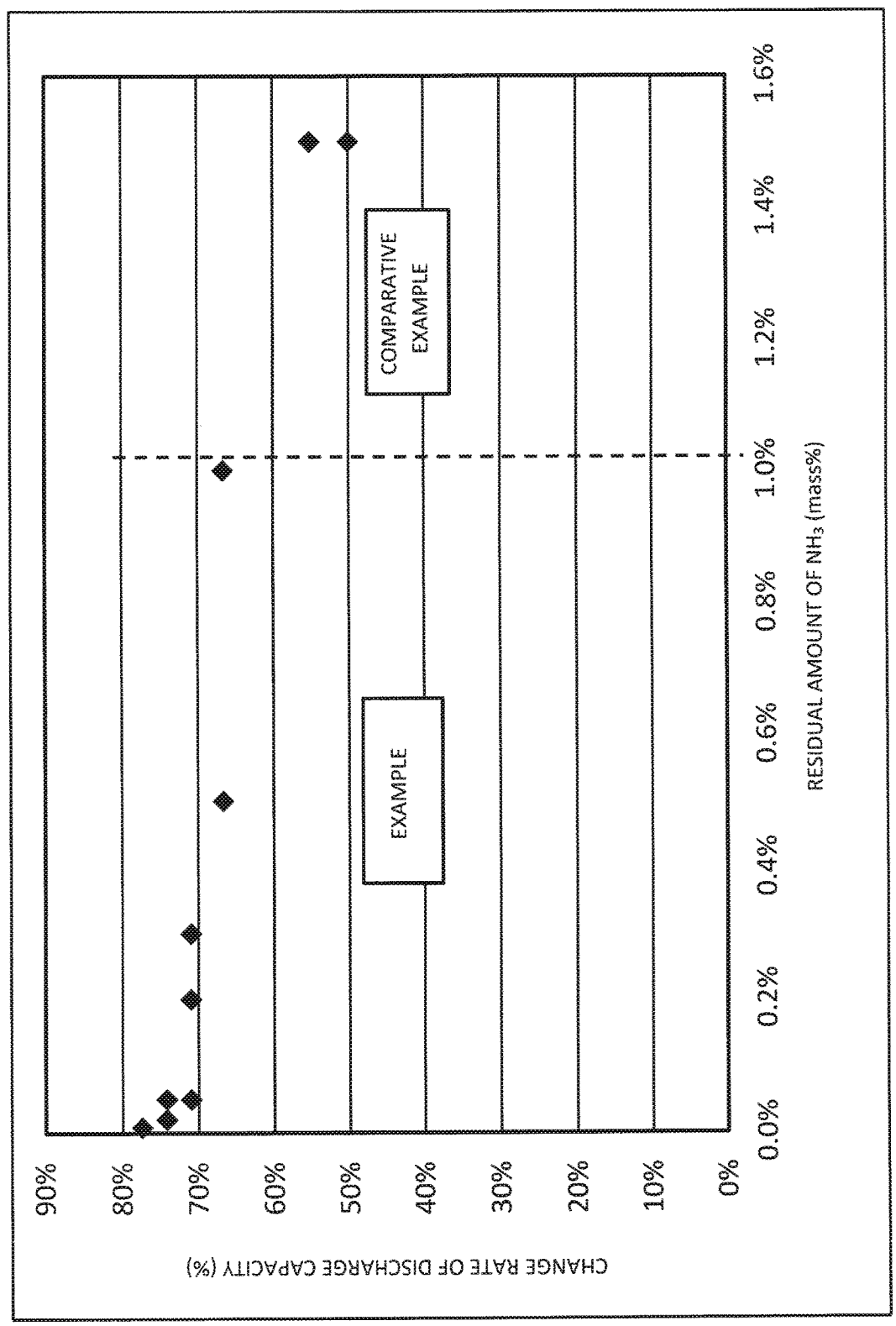
FIG. 4 is a plot of a relationship between residual $NH_3$ amount and a change rate of a discharge capacity in each example and each comparative example.

FIG. 4 is a plot of a relationship between the amount of residual $NH_3$ content and the change rate of the discharge capacity. Referring to FIG. 4, it is found that the example in which the amount of ammonia in the solution is 1 mass % or less has a better change rate than that of the comparative example.

As a result thereof, according to the abovementioned each example, it was possible to obtain a solution excellent in battery characteristics and excellent in handling property when the solution was stored. As a result, when this solution was used to surface-treat (coat) the active material for a secondary battery, it is expected that the coating amount can be easily controlled.

The invention claimed is:

1. A producing method of a solution comprising:
   forming a metal complex solution by mixing at least one of niobic acid and titanic acid with hydrogen peroxide and ammonia;
   mixing a lithium compound with the metal complex solution to form a solution;
   removing the ammonia in the mixed solution until an amount of the ammonia is reduced to 0.3 mass % or less; and
   removing the hydrogen peroxide in the mixed solution until an amount of the hydrogen peroxide is reduced to 1 mass % or less by ultraviolet irradiation, under reduced pressure, heating, or catalase, wherein
   the solution contains
   lithium,
   hydrogen peroxide,
   at least one of
       a niobium complex and
       a titanium complex; and
   ammonia,
   an amount of the ammonia in the solution relative to the total mass of the solution is 0.3 mass % or less, and
   a content of the hydrogen peroxide in the solution is 1 mass % or less.

2. The producing method according to claim 1, wherein the niobium complex or the titanium complex has a peroxy group.

3. The producing method according to claim 2, wherein a molar ratio of atoms in the lithium to atoms of a metal in the niobium complex and the titanium complex is 0.8 to 2.0.

4. The producing method according to claim 1, wherein the solution further contains a reducing compound.

5. The producing method according to claim 4, wherein an amount of the reducing compound in the solution is 0.01 mass % to 5.0 mass % relative to the total mass of the solution.

6. The producing method according to claim 1, wherein
   the amount of the ammonia in the solution relative to the total mass of the solution is 0.02 mass % or more and 0.2 mass % or less,
   the content of the hydrogen peroxide in the solution is 20 ppm or more and 1000 ppm or less,
   in the step of removing the ammonia in the mixed solution, removing the ammonia the mixed solution until the amount of the ammonia is reduced to 0.02 mass % or more and 0.2 mass % or less, and
   in the step of removing the hydrogen peroxide in the mixed solution, moving the hydrogen peroxide in the mixed solution until the amount of the hydrogen peroxide is reduced to 20 ppm or more and 1000 ppm or less by ultraviolet irradiation, under reduced pressure, heating, or catalase.

7. The producing method according to claim 1, further comprising: adding a stability improver to the mixed solution after removing the ammonia in the mixed solution until the amount of the ammonia is reduced to 0.3 mass % or less, wherein
   the stability improver is a reducing compound of carboxylic acids, dicarboxylic acids, hydroxycarboxylic acids, or phosphonic acids.

8. The producing method according to claim 7, wherein the stability improver is citric acid.

9. A producing method of an active material for a secondary battery, comprising:
   providing the solution obtained by the producing method of claim 1,
   performing a surface treatment of the active material using the solution; and
   heat-treating the surface-treated active material.

10. The producing method according to claim 9, wherein the active material is an oxide containing lithium.

11. The producing method according to claim 9, wherein the active material is an oxide containing lithium, and at least one of a lithium niobate compound and a lithium titanate compound is attached to a main surface of the active material.

* * * * *

UNITED STATES PATENT AND TRADEMARK OFFICE
CERTIFICATE OF CORRECTION

PATENT NO. : 11,502,294 B2
APPLICATION NO. : 17/712786
DATED : November 15, 2022
INVENTOR(S) : Y. Aiki et al.

It is certified that error appears in the above-identified patent and that said Letters Patent is hereby corrected as shown below:

In the Claims

Column 20, Line 16 (Claim 6, Line 12) please change "moving" to -- removing --

Signed and Sealed this
Eleventh Day of April, 2023

Katherine Kelly Vidal
*Director of the United States Patent and Trademark Office*